US011425653B2

(12) United States Patent
Hanchett et al.

(10) Patent No.: US 11,425,653 B2
(45) Date of Patent: Aug. 23, 2022

(54) SYSTEMS AND METHODS FOR AUTOMATICALLY ACTIVATING WIRELESS NETWORKS

(71) Applicant: Axon Enterprise, Inc., Scottsdale, AZ (US)

(72) Inventors: Mark A Hanchett, Mesa, AZ (US); Anthony Huang, Seattle, WA (US); Tyler Conant, Seattle, WA (US); Marcus William Lee Womack, Redmond, WA (US); Nache Shekarri, Phoenix, AZ (US); James Reitz, Bainbridge Isalnd, WA (US)

(73) Assignee: Axon Enterprise, Inc., Scottsdale, AZ (US)

( * ) Notice: Subject to any disclaimer, the term of this patent is extended or adjusted under 35 U.S.C. 154(b) by 0 days.

(21) Appl. No.: 17/165,925

(22) Filed: Feb. 2, 2021

(65) Prior Publication Data

US 2021/0168718 A1    Jun. 3, 2021

Related U.S. Application Data

(63) Continuation of application No. 16/291,672, filed on Mar. 4, 2019, now Pat. No. 10,912,033, which is a
(Continued)

(51) Int. Cl.
*H04W 52/02* (2009.01)
*H04W 4/80* (2018.01)
(Continued)

(52) U.S. Cl.
CPC .......... *H04W 52/0229* (2013.01); *G06F 8/60* (2013.01); *G06F 8/65* (2013.01); *G06F 8/658* (2018.02);
(Continued)

(58) Field of Classification Search
None
See application file for complete search history.

(56) References Cited

U.S. PATENT DOCUMENTS 7,904,608 B2    3/2011    Price
9,195,454 B2    11/2015    Wade et al.
(Continued)

OTHER PUBLICATIONS

Canadian Patent Office, Canadian Office Action for Canadian Patent Application No. 2946190 dated Jan. 22, 2018.
(Continued)

*Primary Examiner* — Otis L Thompson, Jr.
(74) *Attorney, Agent, or Firm* — Andrew Graham (57) ABSTRACT

A recording device captures information and stores the information in a data store as a data record. The recording device includes a low-power wireless interface and a high-power wireless interface. A network device includes a low-power wireless interface and a high-power wireless interface. An activation device transmits a data notification and a network notification. Upon receiving the data notification, the network device activates its high-power wireless interface. Upon receiving the network notification, the recording device activates its high-power wireless interface. The recording device transmits the data record to the network device via its high-power wireless interface.

20 Claims, 9 Drawing Sheets

Related U.S. Application Data continuation of application No. 15/331,608, filed on Oct. 21, 2016, now Pat. No. 10,237,822.

(60) Provisional application No. 62/350,904, filed on Jun. 16, 2016.

(51) Int. Cl.

| | | |
|---|---|---|
| *H04W 4/06* | (2009.01) | |
| *G06F 8/658* | (2018.01) | |
| *G06F 8/60* | (2018.01) | |
| *G06F 8/65* | (2018.01) | |
| *H04W 88/06* | (2009.01) | |
| *H04L 67/1095* | (2022.01) | |
| *H04L 67/00* | (2022.01) | |

(52) U.S. Cl.
CPC .............. *H04W 4/06* (2013.01); *H04W 4/80* (2018.02); *H04L 67/1095* (2013.01); *H04L 67/34* (2013.01); *H04W 88/06* (2013.01); *Y02D 30/70* (2020.08)

(56) References Cited

U.S. PATENT DOCUMENTS

| | | | |
|---|---|---|---|
| 9,265,001 | B1 | 2/2016 | Tannenbaum et al. |
| 9,668,217 | B1* | 5/2017 | Bamberger ........... H04W 36/14 |
| 2006/0026304 | A1 | 2/2006 | Price |
| 2009/0276708 | A1 | 11/2009 | Smith et al. |
| 2013/0178160 | A1 | 7/2013 | Wang |
| 2014/0073289 | A1 | 3/2014 | Velasco |
| 2014/0154987 | A1 | 6/2014 | Lee et al. |
| 2015/0149992 | A1 | 5/2015 | Wade et al. |
| 2015/0326774 | A1 | 11/2015 | Chinery, III |
| 2016/0065908 | A1* | 3/2016 | Chang ................. G06F 12/0246 348/158 |
| 2016/0072540 | A1* | 3/2016 | Davis ....................... A45F 5/00 455/575.1 |
| 2016/0110208 | A1 | 4/2016 | Wagner et al. |
| 2016/0171808 | A1* | 6/2016 | Caterino .................. G07C 9/20 340/5.61 |
| 2016/0353233 | A1 | 12/2016 | Yong et al. |
| 2017/0001649 | A1 | 1/2017 | Dickow |
| 2017/0059274 | A1 | 3/2017 | Crist et al. |
| 2017/0064599 | A1 | 3/2017 | Caine et al. |
| 2017/0064745 | A1 | 3/2017 | Kephart, Jr. et al. |
| 2017/0111606 | A1* | 4/2017 | Davis .................... G11B 33/06 |
| 2017/0196044 | A1 | 7/2017 | Nord |
| 2017/0201931 | A1 | 7/2017 | Swanzey et al. |
| 2017/0308817 | A1 | 10/2017 | Miller et al. |
| 2017/0337513 | A1 | 11/2017 | Dimino, Jr. et al. |
| 2018/0027490 | A1 | 1/2018 | Liu et al. |
| 2018/0130639 | A1 | 5/2018 | Costa Requena |
| 2019/0006891 | A1 | 1/2019 | Park et al. |
| 2019/0037166 | A1* | 1/2019 | Davis ....................... A41D 1/06 |

OTHER PUBLICATIONS

Canadian Patent Office, Canadian Office Action for Canadian Patent Application No. 2946190 dated Nov. 14, 2018.

USPTO, Non-Final Office Action for U.S. Appl. No. 15/619,462 dated Apr. 10, 2018.

USPTO, Final Office Action for U.S. Appl. No. 15/619,462 dated Nov. 5, 2018.

USPTO, Non-Final Office Action for U.S. Appl. No. 15/619,462 dated Apr. 10, 2019.

\* cited by examiner

SYSTEMS AND METHODS FOR AUTOMATICALLY ACTIVATING WIRELESS NETWORKS

CROSS-REFERENCE TO RELATED APPLICATION

This application claims the benefit of U.S. Provisional Application No. 62/350,904, filed Jun. 16, 2016, the entire disclosure of which is hereby incorporated by reference herein in its entirety.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a system for managing power for wireless communication is provided. The system comprises a network device and a recording device. The network device includes a low-power interface, a high-power interface, and a wireless interface control engine. At least a portion of the high-power wireless interface is separate from the low-power wireless interface. The wireless interface control engine of the network device is configured to selectively activate the high-power wireless interface in response to receiving a connectionless data notification via the low-power wireless interface. The recording device includes a low-power interface, a high-power interface, and a wireless interface control engine. At least a portion of the high-power wireless interface is separate from the low-power wireless interface. The wireless interface control engine of the recording device is configured to selectively activate the high-power wireless interface for transmission of a data record to the network device.

In some embodiments, a method of receiving a data record from a recording device is provided. A wireless interface control engine receives, from a first wireless interface of a network device, a data notification via a connectionless protocol. The wireless interface control engine activates a second wireless interface of the network device, and the data record is received, via the second wireless interface, from the recording device.

In some embodiments, a method of transmitting a data record via a wireless network is provided. A recording device broadcasts, via a first wireless interface, a connectionless notification indicating presence of the data record. A notification is received, by the recording device, indicating that communication via a second wireless interface is available. The recording device activates the second wireless interface, and the recording device transmits the data record via the second wireless interface.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
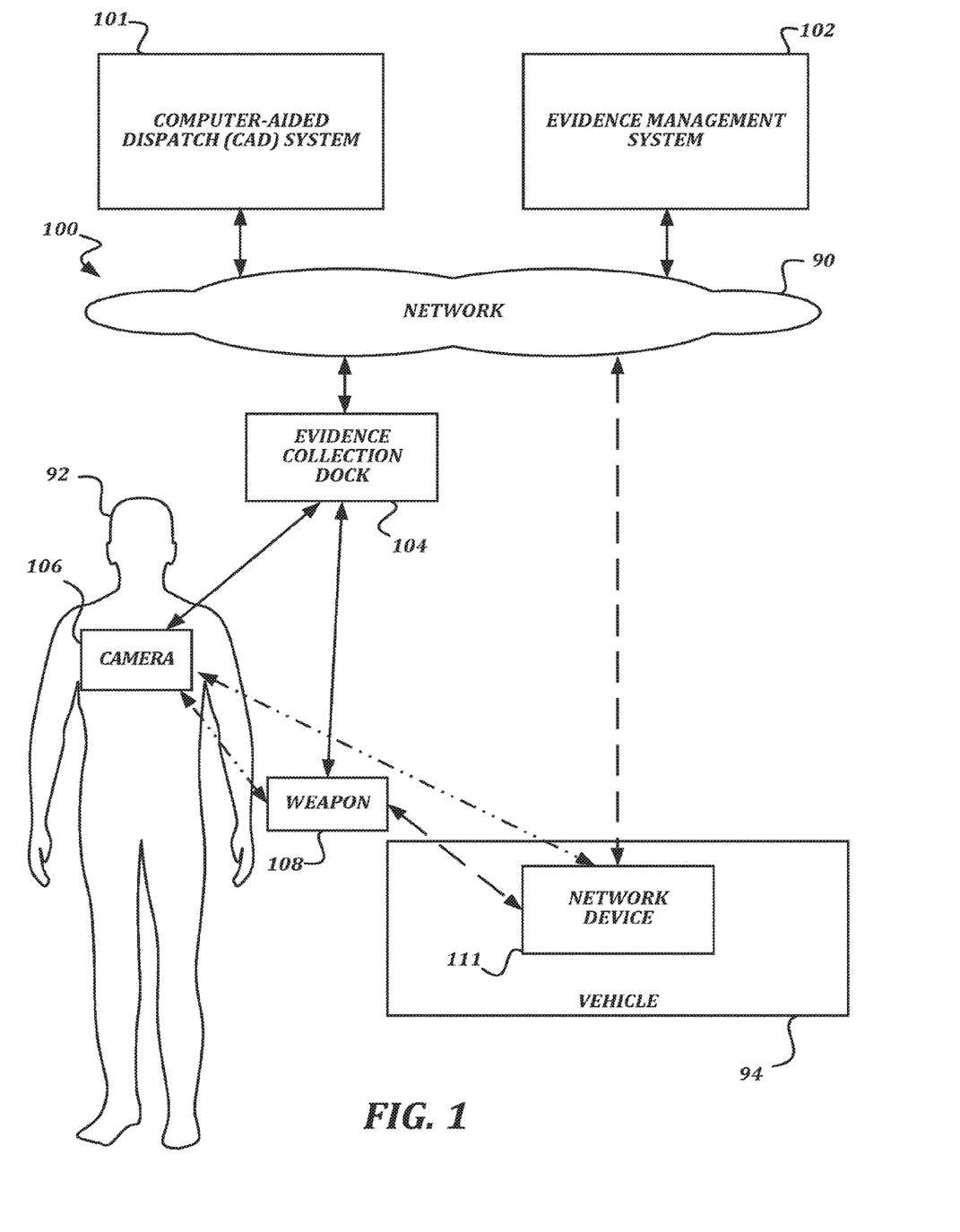
FIG. 1 is a high-level schematic diagram that illustrates communication between various components of an exemplary embodiment of a system according to various aspects of the present disclosure.

FIG. 1 is a high-level schematic diagram that illustrates communication between various components of an exemplary embodiment of a system according to various aspects of the present disclosure. In some embodiments, the system 100 is configured to allow for communication between and collection of information from a plurality of devices. Recorded information is generated by the devices while they are being operated, and may be gathered by an evidence management system 102.

In general, a user 92, such as a law enforcement officer, may carry one or more recording devices. The devices may include, but are not limited to, one or more cameras 106 and one or more weapons 108. The camera 106 may be, for example, a wearable camera that records video information, audio information, logging information, and/or other types of information (including but not limited to event information such as events marking the start of recording, the end of recording, various device faults, signals received from other devices, and/or the like). The weapon 108 may be, for example, a conducted energy weapon (CEW) that records firing events, cartridge loading, holster removal, and/or the like. Other recording devices, such as an in-car camera, a biometric sensor such as a heart rate sensor and/or the like, a gunshot location sensor, a vehicle telemetry sensor, and/or the like, may also be included in the system 100 but are not illustrated in FIG. 1.

In some embodiments, the recording devices may transmit recorded information to the evidence management system 102. In some embodiments, the recording devices may transmit the recorded information when physically connected to an evidence collection dock 104 that communicates with the evidence management system 102 via a broadband network 90 such as a LAN, a WAN, and/or the Internet. In some embodiments, the recording devices may transmit the recorded information when a communication path can be established from the recording device to another device via a high-bandwidth wireless connection, including but not limited to a WiFi connection, a Long Term Evolution connection, and/or the like.

In some embodiments, a network device 111 may be present within the system 100. In some embodiments, the network device 111 can communicate with recording devices via a wireless connection in order to receive data records. In some embodiments, the network device 111 may provide a bridge or other network route to the network 90, such that a recording device that connects with the network device 111 via the wireless connection may transmit recorded information directly to the evidence management system 102. The network device 111 may connect to the network 90 using any suitable technology, including wireless technologies such as 3G, 4G, Long Term Evolution, and/or the like. In some embodiments, the network device 111 may store the data record itself, or may allow the recording device to transmit the recorded information to a storage device within the vehicle 94 or some other device accessible via the network device 111. The storage device may subsequently be used to transfer the recorded information to the evidence management system 102.

Though the network device 111 is illustrated as being installed in or otherwise associated with the vehicle 94, in some embodiments the network device 111 may be a stand-alone device, or could be incorporated within another device such as a mobile data terminal (MDT), a smartphone computing device, a tablet computing device, a camera similar to a recording device, a weapon, an evidence collection dock 104, and/or any other device. In some embodiments (including but not limited to embodiments wherein the network device 111 is incorporated into or otherwise associated with the evidence collection dock 104), the network device 111 may communicate with the network 90 or other devices via a wired communication interface such as Ethernet and/or the like.

In some embodiments, recording devices (such as the camera 106 and the weapon 108), evidence collection docks 104, and/or access point devices 111 may also communicate with a computer-aided dispatch (CAD) system 101. The CAD system 101 may communicate with the devices using any suitable technique, including but not limited to internet data communication over 3G, 4G, Long Term Evolution, or a similar long-range wireless protocol; short message service (SMS) messages, selective calling, or any other suitable technique. The CAD system 101 may communicate directly with the devices or may communicate with the devices via one or more intermediate devices. Further aspects of these devices and their capabilities will be discussed below.

While the availability of wireless communication paths between recording devices and network devices does make it easier to transmit recorded information from the recording devices to other components of the system 100, there are technical problems that arise by the use of such techniques. For example, though high-bandwidth wireless communication allows large amounts of recorded data (such as audio or video) to be transmitted in a reasonable amount of time, high-bandwidth wireless communication is comparatively power hungry compared to lower bandwidth wireless communication. As such, battery-powered devices such as cameras 106 and weapons 108 will have reduced battery life if they use their high-bandwidth wireless interfaces constantly. This is a particular problem in the law enforcement context. It is contemplated in the law enforcement context that a camera 106 or weapon 108 may be in use for an entire shift (eight or more hours) at a time without recharging. Users 92 in the law enforcement context already carry a great deal of equipment, and so increasing the size and weight of the batteries in order to increase battery life is not a feasible option.

It is also desirable for the network device 111 to minimize power consumption. Even if the network device 111 is installed in and powered by a vehicle 94, increased electrical load on the vehicle alternator can result in reduced fuel economy. Further, in some embodiments the network device 111 may be battery powered or solar powered, and so reducing power consumption would be important for the same reasons as those discussed above with respect to the camera 106 or weapon 108.

Another problem in some embodiments of the system 100 is that the recording devices and the network device 111 may have a minimal or inaccessible user interface. For example, a camera 106 may be designed to be controllable with a single large button in order to simplify the user interface. In such an embodiment, it is difficult to assign different commands to the single button, which would mainly be used to change a recording state of the camera 106. As another example, the user 92 may not be inside of the vehicle 111, and so any user interface on a network device 111 within the vehicle would be inaccessible. Accordingly, it is desirable in some embodiments for the recordable devices and the network device 111 to be able to automatically activate their wireless interfaces without a user 92 taking action to activate either interface. Such features would also be desirable in embodiments wherein the recordable devices are configured to automatically transmit data records once they are completed so that user intervention would not be necessary to initiate such transfer.

Yet another problem exists with regard to data security. If a wireless network provided by the network device 111 (or other device) is constantly available, the network will be more vulnerable to access and/or attack by unauthorized and/or malicious individuals. This is particularly troublesome in the law enforcement context for several reasons. One reason is that the network device 111 and the recording devices are likely to be deployed in public, and so physical proximity to the devices cannot be controlled. Another reason is that the data records stored and transmitted by the recording devices can be highly sensitive information that represents evidence in criminal proceedings, and so being able to reliably control access to the data records and transfer them when needed is desirable.

In order to address these technical difficulties and to provide other benefits, embodiments of the present disclosure provide for the selective enablement of a high-power wireless network on the recording device, the network device, and/or both. In some embodiments, a recording device broadcasts a notification via a low-power wireless interface. The notification may be received by a network device, which activates its high-power wireless interface in response. A recording device may transmit such a notification to wake up a network device after the recording device has captured information and is ready to transfer the information to the evidence management system 102 or other device. The network device may operate in a low-power mode until receipt of the notification, wherein the low-power mode may include operating a low-power wireless interface. In some embodiments, the network device may likewise transmit a notification via a low-power wireless interface to indicate that the high-power wireless interface has been activated. In response to receiving such a notification, the recording device may activate its own high-power wireless interface in order to complete the connection.

Figure 2A:
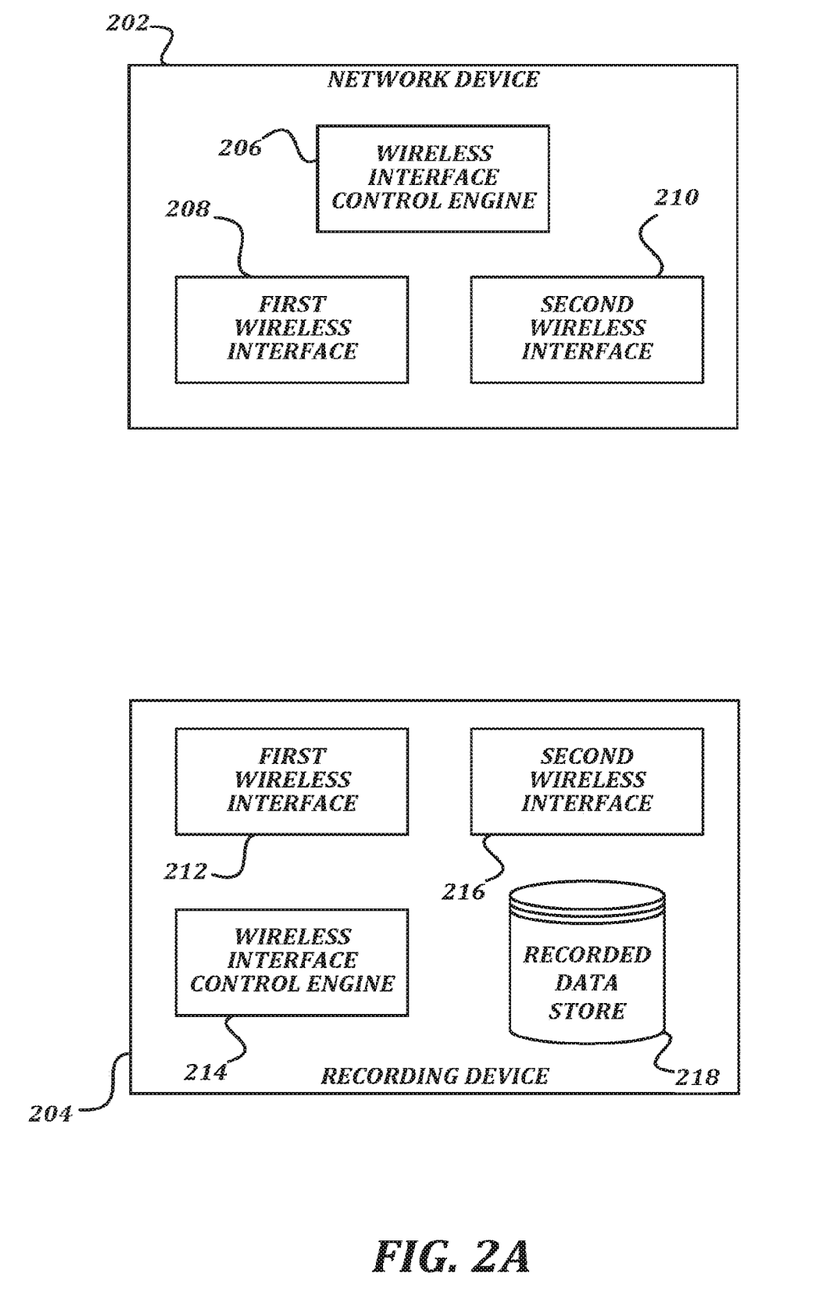
FIG. 2A is a block diagram that illustrates exemplary embodiments of a network device and a recording device according to various aspects of the present disclosure.

FIG. 2A is a block diagram that illustrates exemplary embodiments of a network device 202 and a recording device 204 according to various aspects of the present disclosure. In some embodiments, the recording device 204 may be any device that records information, including but not limited to a wearable camera such as a digital video camera, an audio recording device, a conducted energy weapon (CEW), an in-car camera, a biometric sensor such as a heart rate sensor and/or the like, a gunshot location sensor, a vehicle telemetry sensor, and/or any other type of recording device.

In some embodiments, the network device 202 may be a device installed in a vehicle 94 that provides a wireless network. In some embodiments, the network device 202 may be a dedicated device that performs few other functions than the functions described herein, while in some embodiments, the network device 202 functionality may be incorporated into a more complicated device including, but not limited to, a mobile data terminal (MDT), a smartphone, a tablet computing device, and/or any other type of computing device. In some embodiments, the network device 202 may store data records before transmitting them to another device such as a device of a storage system within the vehicle 94 or at another location. In some embodiments, the network device 202 may act as a network router, switch, or bridge, and may provide access to the network 90 for the recording device 204 to transmit data records to a storage system or evidence management system 102 accessible thereon.

As illustrated, the network device 202 includes a wireless interface control engine 206, a first wireless interface 208, and a second wireless interface 210. In some embodiments, the first wireless interface 208 may include hardware and logic configured to provide a first type of network functionality, and the second wireless interface 210 may include hardware and logic configured to provide a second type of network functionality different form the first type of network functionality. In some embodiments, the first wireless interface 208 and the second wireless interface 210 are different in that the first wireless interface 208 is capable of operating in a mode that has low power consumption compared to high-power operating modes of the second wireless interface 210. As a tradeoff, the low-power modes of the first wireless interface 208 may provide low bandwidth compared to the high-bandwidth modes of the second wireless interface 210. In some embodiments, the low-power modes of the first wireless interface 208 are capable of transmitting and/or receiving broadcast communications without forming a paired connection with a receiving/transmitting device.

One example of a network interface suitable for use as the first wireless interface 208 is a Bluetooth Low Energy (BLE) interface, sometimes interchangeably referred to as a Bluetooth Smart interface. Other examples of network technologies suitable for use in the first wireless interface 208 include, but are not limited to, ZigBee, ultrasonic/audible data transmission, near-field communication (NFC), Z-Wave, CAT-1 and/or CAT-0 versions of Long Term Evolution, Sigfox communication, and/or the like. One example of a network interface suitable for use as the second wireless interface 210 is a WiFi interface. Other examples of network technologies suitable for use in the second wireless interface 210 include, but are not limited to, Long Term Evolution, 4G, WiMAX, and/or the like.

The wireless interface control engine 206 is configured to control the first wireless interface 208 and the second wireless interface 210, including but not limited to selectively activating and deactivating the interfaces 208, 210, as well as transmitting and receiving information via the interfaces 208, 210. Further details of actions performed by the wireless interface control engine 206 are described below. In general, the term "engine" as used herein refers to logic embodied in hardware or software instructions, which can be written in a programming language, such as C, C++, COBOL, JAVA™, PHP, Perl, HTML, CSS, JavaScript, VBScript, ASPX, Microsoft .NET™ languages such as C #, and/or the like. An engine may be compiled into executable programs or written in interpreted programming languages. An engine may be provided by hardware configured to execute logic, including but not limited to one or more field programmable gate arrays (FPGAs) and/or one or more application-specific integrated circuits (ASICs). Engines may be callable from other engines or from themselves. Generally, the engines described herein refer to logical modules that can be merged with other engines, or can be divided into sub-engines. The engines can be stored in any type of computer readable medium or computer storage device and be stored on and executed by one or more general purpose computing processors, thus creating a special purpose computer configured to provide the engine. Accordingly, the devices and systems illustrated herein include one or more computing devices configured to provide the illustrated engines, though the computing devices themselves have not been illustrated in every case for the sake of clarity.

As illustrated, the recording device 204 includes a first wireless interface 212, a second wireless interface 216, a wireless interface control engine 214, and a recorded data store 218. The first wireless interface 212 may be similar to the first wireless interface 208 in the network device 202, in that it comprises hardware and logic for communicating via a technique complimentary to the technique used by the first wireless interface 208. As a non-limiting example, the first wireless interface 208 may be configured to transmit a BLE advertising packet, and the first wireless interface 212 may be configured to receive the BLE advertising packet. Likewise, the second wireless interface 216 may be similar to the second wireless interface 210, in that it comprises hardware and logic for providing the complementary functionality to the second wireless interface 210 on the network device 202. As a non-limiting example, the second wireless interface 210 may be configured to provide a WiFi access point, and the second wireless interface 216 may be configured to connect to the network provided by the WiFi access point. As another non-limiting example, the second wireless interface 216 may be configured to provide a WiFi access point, and the second wireless interface 210 may be configured to connect to the network provided by the WiFi access point. As with the wireless interface control engine 206, the wireless interface control engine 214 is configured to activate and deactivate the first wireless interface 212 and the second wireless interface 216, and to transmit and receive information via the interfaces 212, 216, as described further below.

The recorded data store 218 is configured to store data records generated by the recording device 204. The stored data records may include, but are not limited to, one or more of video data, audio data, biometric data, vehicle telemetry data, records of received signals, hardware status data, event data, and/or any other type of information. As understood by one of ordinary skill in the art, a "data store" as described herein may be any suitable device configured to store data for access by a computing device. One example of a data store includes data stored in an organized manner on a computer-readable storage medium. One example of a data store suitable for use with the recording device 204, which desires reliable storage but also low overhead, is a file system or database management system that stores data in files (or records) on a computer readable medium such as flash memory, random access memory (RAM), hard disk drives, and/or the like. One example of a data store suitable for use with the high capacity needs of the evidence management system 102 is a highly reliable, high-speed relational database management system (RDBMS) executing on one or more computing devices and accessible over a high-speed network. Any other suitable storage technique and/or device capable of quickly and reliably providing the stored data in response to queries may be used, such as a key-value store, an object database, and/or the like. Further, for the evidence management system 102, the computing device providing the data store may be accessible locally instead of over a network, or may be provided as a cloud-based service. One of ordinary skill in the art will recognize that separate data stores described herein may be combined into a single data store, and/or a single data store described herein may be separated into multiple data stores, without departing from the scope of the present disclosure.

In FIG. 2A, the network device 202 and the recording device 204 are in a state wherein both second wireless interfaces 210, 216 are inactive. In some embodiments, a wireless interface is in an "inactive" state when it is in a state that lacks full functionality in order to conserve power. As one example, an inactive wireless interface may consume a small amount of power to execute its logic, but may not energize its radio or antenna in order to receive or transmit information. In some embodiments, the first wireless interface 208 and the second wireless interface 210 (and/or the first wireless interface 212 and the second wireless interface 216) may share components or otherwise be provided by the same hardware (such as a shared wireless communication ASIC). In such embodiments, power may be provided to both interfaces, but the inactive interface does not energize its radio or antenna and does not transmit or receive wireless information while inactive. Also in FIG. 2A, the first wireless interface 208 on the network device 202 is in an active state wherein it can wirelessly receive notifications via a connectionless protocol. Because the first wireless interface 208 may be a relatively low-power wireless interface such as Bluetooth Low Energy and/or the like, this active state may be maintained without unduly shortening the battery life of the network device 202. The first wireless interface 212 on the recording device 204 may be in a similar active state, or may be in an inactive state.

Figure 2B:
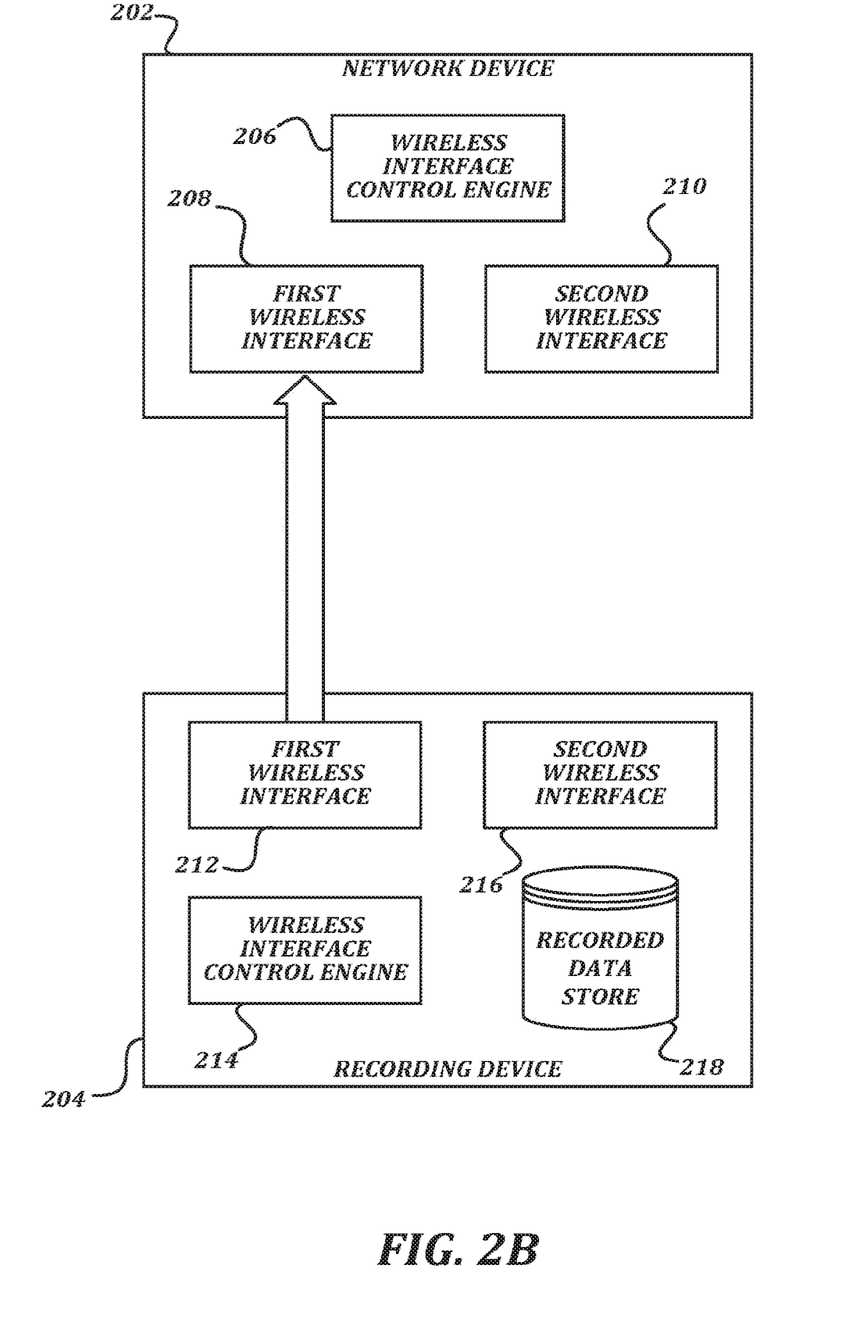
FIG. 2B is a block diagram that illustrates an exemplary embodiment of a state wherein the recording device has stored a data record in the recorded data store that should be transmitted to another device.

FIG. 2B is a block diagram that illustrates an exemplary embodiment of a state wherein the recording device 204 has stored a data record in the recorded data store 218 that should be transmitted to another device. The wireless interface control engine 214 causes the first wireless interface 212 to be activated (if inactive) and to transmit a data notification to indicate that the data record is present and ready to be transmitted. The data notification is received by the wireless interface control engine 206 via the first wireless interface 208 of the network device 202. In response, the wireless interface control engine 206 activates the second wireless interface 210.

Figure 2C:
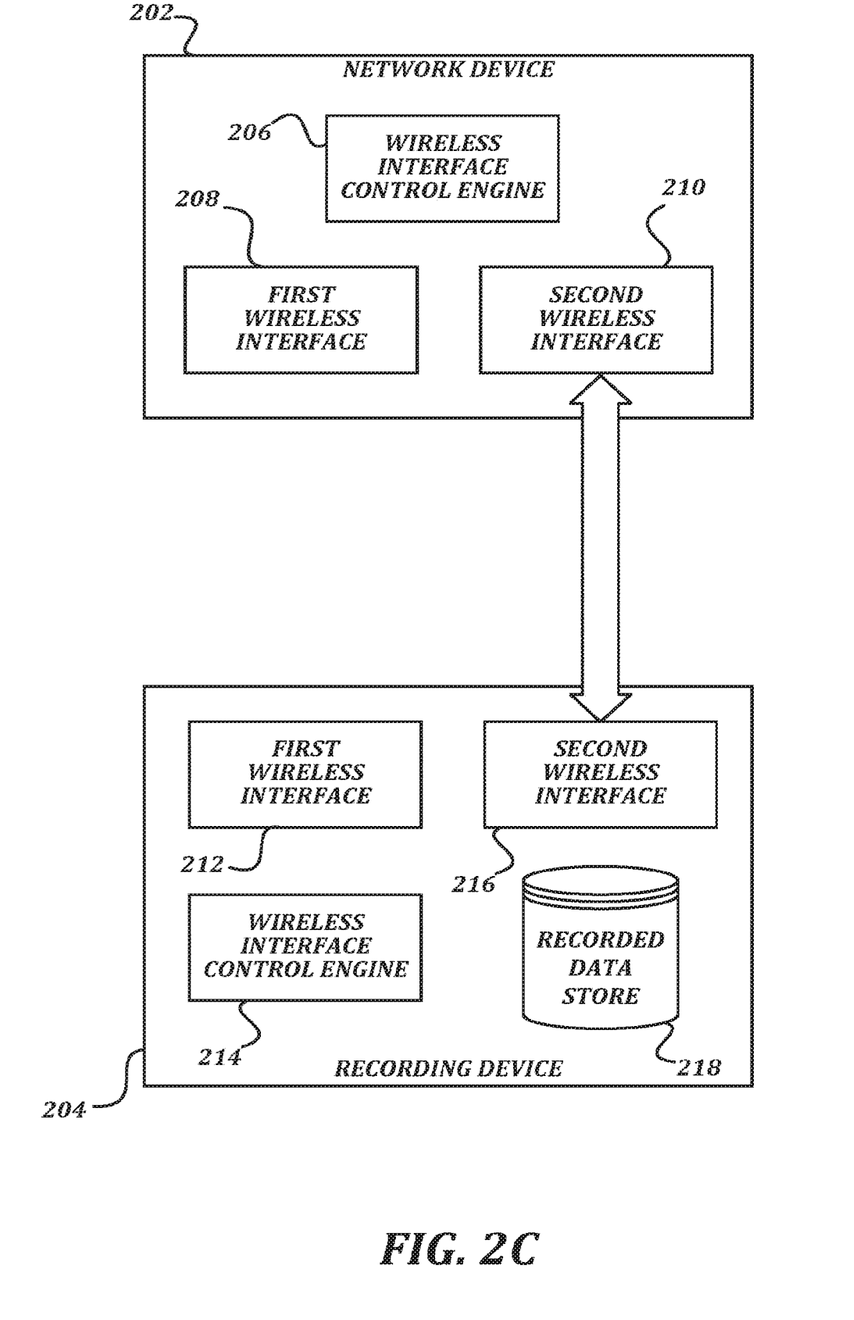
FIG. 2C is a block diagram that illustrates an exemplary embodiment of a state where the wireless interface control engine has subsequently activated the second wireless interface, and a high-bandwidth connection between the network device and the recording device is established.

FIG. 2C is a block diagram that illustrates an exemplary embodiment of a state where the wireless interface control engine 214 has subsequently activated the second wireless interface 216, and a high-bandwidth connection between the network device 202 and the recording device 204 is established. The data record may then be transmitted from the recording device 204 to the network device 202. Further details of the process for establishing the high-bandwidth connection and transmitting the data record are provided below.

Figure 3A:
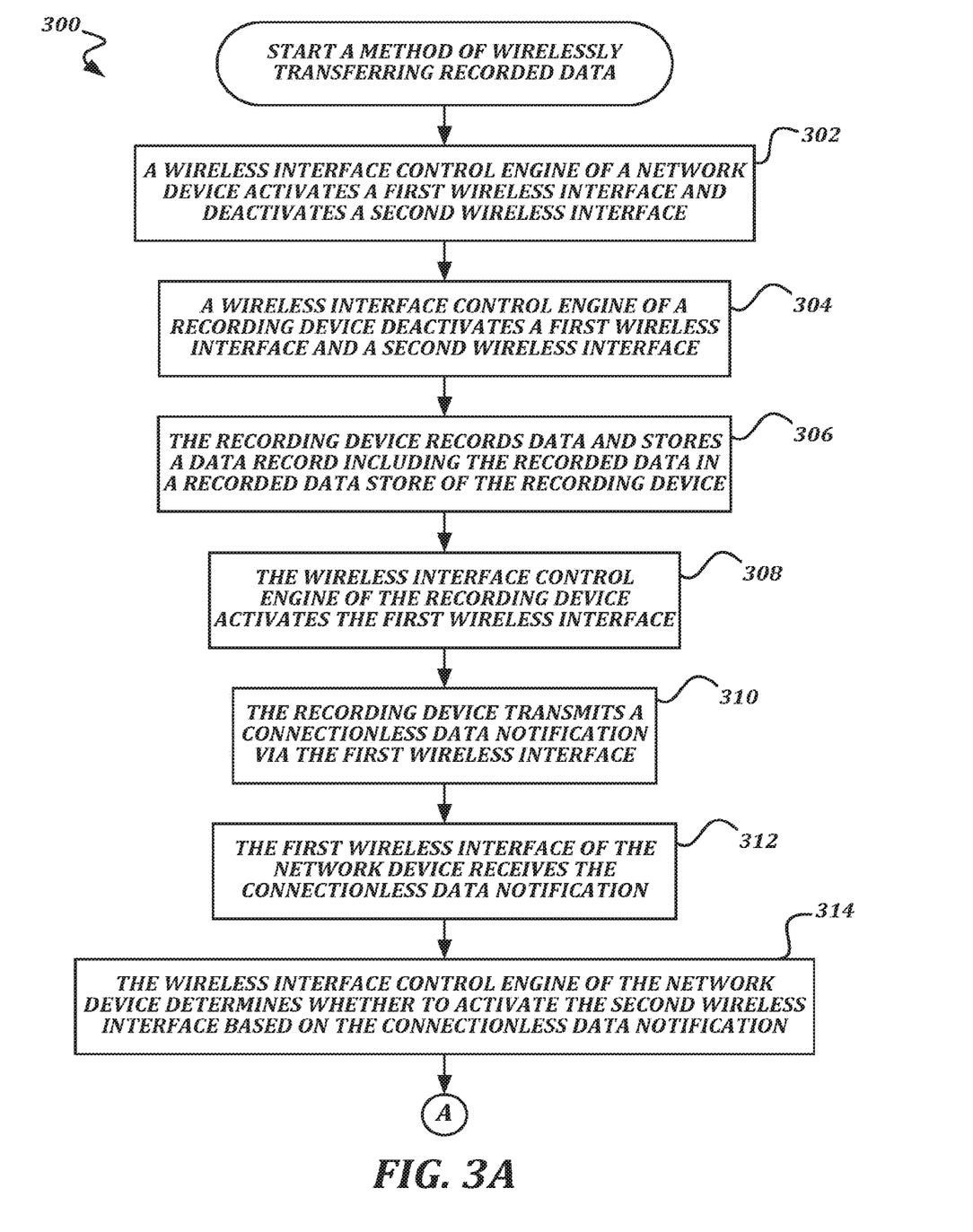
FIGS. 3A-3B are a flowchart that illustrates an exemplary embodiment of a method of wirelessly transferring recorded data according to various aspects of the present disclosure.
Figure 3B:
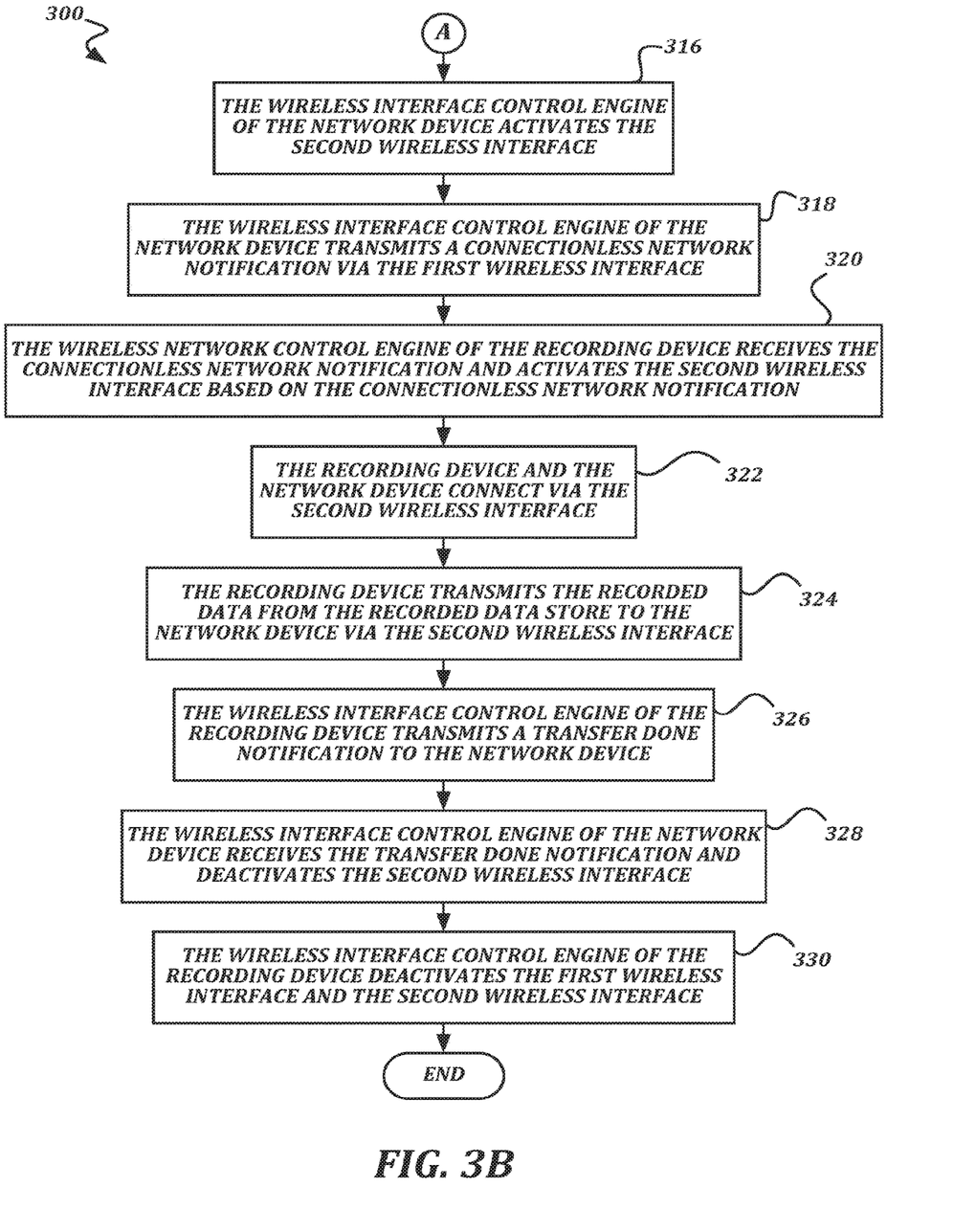

FIGS. 3A-3B are a flowchart that illustrates an exemplary embodiment of a method of wirelessly transferring recorded data according to various aspects of the present disclosure. From a start block, the method 300 proceeds to block 302, where a wireless interface control engine 206 of a network device 202 activates a first wireless interface 208 and deactivates a second wireless interface 210. In some embodiments, the first wireless interface 208 may be active and the second wireless interface 210 may be inactive before the method 300 starts, in which case the block 302 may be skipped or unnecessary. At block 304, a wireless interface control engine 214 of a recording device 204 deactivates a first wireless interface 212 and a second wireless interface 216. Again, in some embodiments, the first wireless interface 212 and the second wireless interface 216 may already be in this state before the method 300 begins, and so the actions of block 304 may be skipped or unnecessary. As discussed above, deactivating a wireless interface may include de-energizing a radio or antenna associated with the wireless interface, while activating a wireless interface may include energizing a radio or antenna associated with the wireless interface. In some embodiments, deactivating the first wireless interface 212 may include ceasing to transmit one type of notification (such as a data notification) but continuing to transmit or receive other types of notifications. In some embodiments, the recording device 204 may only deactivate its second wireless interface 216, while leaving its first wireless interface 212 active.

Next, at block 306, the recording device 204 records data and stores a data record including the recorded data in a recorded data store 218 of the recording device 204. The method 300 then proceeds to block 308, where the wireless interface control engine 214 of the recording device 204 activates the first wireless interface 212. Activating the first wireless interface 212 may include initialization, energizing a radio or antenna, and/or the like. In some embodiments, the first wireless interface 212 may have already been active, in which case the activation performed in block 308 may be unnecessary. Next, at block 310, the recording device 204 transmits a connectionless data notification via the first wireless interface 212. In some embodiments, once the data record is complete, the method 300 automatically proceeds to block 308, block 310, and beyond without user intervention. In some embodiments, the method 300 may automatically proceed to block 308, block 310, and beyond without user intervention at any point after the recording device 204 begins recording the data, even if the data record is not entirely complete.

Transmitting a connectionless data notification may also be referred to as broadcasting a data notification. Transmitting a connectionless data notification (instead of forming a connection to a receiving device) is a lightweight way to broadcast the data notification, and can be done in a way that saves power. One example of a technique of sending a connectionless data notification is to transmit a Bluetooth Low Energy (BLE) advertising packet, though other suitable techniques of transmitting information without first performing a handshake or forming some other type of connection could be used. The data notification indicates the presence of the data record, and may include information regarding the recording device 204 or the data record. For example, the data notification may include information including, but not limited to, a unique identifier of the recording device 204, a type identifier of the recording device 204, a type of data stored in the data record, a size of the data record, a priority level, free space remaining within the recorded data store 218, and/or any other type of information.

Next, at block 312, the first wireless interface 208 of the network device 202 receives the connectionless data notification. At block 314, the wireless interface control engine 206 of the network device 202 determines whether to activate the second wireless interface 210 based on the connectionless data notification. The wireless interface control engine 206 may make the determination using any suitable technique. For example, the wireless interface control engine 206 could check a type of data indicated by the connectionless data notification, and base its determination on whether it is configured to process the indicated type of data. As another example, the wireless interface control engine 206 could check a size of data indicated by the connectionless data notification, and base its determination on whether adequate storage space is available to the network device 202 to store the data record, or whether the network device 202 has sufficient room under a data cap limit to transmit the data record to another device. As yet another example, the wireless interface control engine 206 could use the size of data indicated to determine how long it would take to transfer the data record, and could base its determination on whether the data record could be transferred during a predicted amount of remaining battery life. As still another example, the network device 202 may store a whitelist of devices that are allowed to activate the second wireless interface 210 and/or a blacklist of devices that are not allowed to activate the second wireless interface 210. The wireless interface control engine 206 may then base its determination on a comparison of a device identifier included in the connectionless data notification to the entries on the whitelist and/or blacklist. As still another example, the wireless interface control engine 206 may cause a connection to be formed via the first wireless interface 208 (such as a Bluetooth pairing or another type of connection) between the recording device 204 and the network device 202 in order to exchange further information to determine whether the second wireless interface 210 should be activated.

Assuming that the wireless interface control engine 206 has determined that the second wireless interface 210 should be activated, the method 300 then proceeds to a continuation terminal ("terminal A"). If the wireless interface control engine 206 had determined that the second wireless interface 210 should not be activated, the method 300 may terminate, or may return to block 310 to send another connectionless data notification. The method 300 may continue to loop back to block 310 until the network device 202 (or a different network device) accepts the connectionless data notification and activates its second wireless interface 210.

From terminal A (FIG. 3B), the method 300 proceeds to block 316, where the wireless interface control engine 206 of the network device 202 activates the second wireless interface 210. As discussed above, activation may include energizing a radio or antenna associated with the second wireless interface 210. At block 318, the wireless interface control engine 206 of the network device 202 transmits a connectionless network notification via the first wireless interface 208. In some embodiments, the connectionless network notification may be a Bluetooth Low Energy (BLE) advertising packet. The connectionless network notification indicates, via the first wireless interface 208, that the network device 202 is ready to communicate via the second wireless interface 210. In some embodiments, the connectionless network notification may include an SSID or other information that helps the recording device 204 to identify and connect to a WiFi network access point provided by the network device 202. In some embodiments, the connectionless network notification may include an identifier of the network device 202 or other information to allow the recording device 204 to look up appropriate network credentials to use to connect to a WiFi network access point provided by the network device 202.

The method 300 then proceeds to block 320, where the wireless network control engine 214 of the recording device 204 receives the connectionless network notification and activates the second wireless interface 216 based on the connectionless network notification. In some embodiments, the wireless network control engine 214 may use network identification information provided in the connectionless network notification to connect to a network provided by the network device 202. In some embodiments, the wireless network control engine 214 may use an identifier provided in the connectionless network notification to determine credentials to be used to connect to a network provided by the network device 202. In some embodiments, the wireless network control engine 214 may simply use the receipt of the connectionless network notification as a trigger to activate the second wireless interface 216.

At block 322, the recording device 204 connects to the network device 202 via the second wireless interface 216. In some embodiments, the network device 202 may use its second wireless interface 210 to provide a WiFi access point, and the recording device 204 may connect to the WiFi network provided by the network device 202. In some embodiments, the recording device 204 may use its second wireless interface 216 to provide a WiFi access point, and the network device 202 may connect to the WiFi network provided by the recording device 204. Connecting may include any suitable technique for establishing a communication channel, including but not limited to an authentication handshake, establishment of an encrypted communication channel, and/or the like.

In some embodiments of the method 300, some or all of the actions of block 318 and block 320 may be skipped. For example, in some embodiments, the recording device 204 may activate its second wireless interface 216 to check for connectivity after transmitting the connectionless data notification, whether or not it has received a connectionless network notification from the network device 202. This is particularly likely in embodiments wherein the recording device 204 provides the WiFi access point and the network device 202 connects to the WiFi network provided by the recording device 204.

Once the recording device 204 and the network device 202 have connected via the second wireless interfaces 216, 210, the method 300 proceeds to block 324, where the recording device 204 transmits the data record from the recorded data store 218 to the network device 202 via the second wireless interface 216. In some embodiments, the data record may be complete as stored in the recorded data store 218, and the entire data record may be transmitted to the network device 202. In some embodiments, the data record may be in the process of being updated (such as having new data appended thereto), and so the data record may be streamed from the recording device 204 to the network device 202. In some embodiments, sensor data may be streamed directly from the recording device 204 to the network device 202 while it is being obtained without first being stored in a significant amount or for a significant time in the recorded data store 218.

In some embodiments, the network device 202 may perform processing on the data record. Some examples of processing that may be performed by the network device 202 include, but are not limited to, encrypting, decrypting, or re-encrypting the data record; changing a bit rate of data in the data record; adding metadata to the data record; adding an overlay to a data record that includes video data;

combining the data record with data from another source; or any other type of processing. In some embodiments, the network device 202 may store the data record. In some embodiments, the network device 202 may transmit the data record to another device via a wired or a wireless connection. For example, the network device 202 may transmit the data record to an evidence management system 102; to a storage device in a vehicle 94; to another device such as a camera 106 or weapon 108; to a smartphone; to a tablet computing device; to a mobile data terminal (MDT), and/or any other suitable type of device. In some embodiments, the network device 202 may transmit a notification to the recording device 204 indicating that this processing or transmission to a third device has been completed successfully (so that the recording device 204 may safely mark the data record for deletion), and/or a notification indicating that the processing or transmission failed (so that the recording device 204 may retain or retransmit the data record). In embodiments wherein the network device 202 transmits the data record to a remote device via the network 90, the network device 202 may activate an interface to the network 90 in coordination with the activation of the second wireless interface 210.

Once the recording device 202 has transmitted the data record it intended to transmit to the network device 204, the method 300 proceeds to block 326, where the wireless interface control engine 214 of the recording device 204 transmits a transfer done notification to the network device 202. The transfer done notification may be transmitted via the first wireless interface 212 or the second wireless interface 216, since both are activated at this point in the method 300. At block 328, the wireless interface control engine 206 of the network device 202 receives the transfer done notification and deactivates the second wireless interface 210. In some embodiments, deactivating the second wireless interface 210 includes de-energizing a radio and/or antenna associated with the second wireless interface 210. As described, the method 300 assumes that there are no other recording devices concurrently exchanging information with the network device 202 via the second wireless interface 210. In some embodiments, if other recording devices are communicating with the network device 202 via the second wireless interface 210, the wireless interface control engine 206 would wait to deactivate the second wireless interface 210 until transfer done notifications were received from all of the connected recording devices. At block 330, the wireless interface control engine 214 of the recording device 204 deactivates the first wireless interface 212 and the second wireless interface 216. In some embodiments, only the second wireless interface 216 may be deactivated, while the first wireless interface 212 remains active. Again, deactivating the wireless interfaces may include de-energizing an associated radio and/or antenna. The method 300 then proceeds to an end block and terminates.

The description of the method 300 above largely assumes an uninterrupted transfer of the data record to the network device 202. However, in some embodiments, the transfer may be interrupted for a variety of reasons. For example, during data transfer, the recording device 204 may leave a communication range of the network device 202 (or otherwise lose its connection with the network device 202) before the complete transmission of the data record. In such a situation, the second wireless interface 210, 216 may remain activated for a predetermined amount of time to attempt to reestablish the connection before being deactivated.

As another example, a limited amount of processing power may be available, and so other actions taken by the recording device 204 or the network device 202 may interrupt the connection. In some embodiments, receiving an instruction to record data may take precedence over data record transfer operations. Also, receiving an instruction to live stream data from the recording device 204 may take precedence over transfer operations for stored data records from the recorded data store 218. If a transfer is interrupted for such a reason, the recording device 204 and/or the network device 202 may identify the last block of the data record that had been successfully transferred so that the transfer may be continued from that point once priority is regained.

Using a connectionless protocol for the data notification and the network notification has multiple benefits. One example of a benefit is that connectionless protocols typically have low overhead, and so power consumption can be greatly minimized. Another example of a benefit is that instead of requiring a pairing between a particular network device 202 and a recording device 204 before the notifications can be communicated, any device may transmit a notification. As such, a third device can participate in the activation of the second wireless interfaces 210, 216, thus allowing some embodiments to employ third-party control over the communication between the network device 202 and the recording device 204. This may be useful for many reasons, including but not limited to providing the ability to have a separate device with a rich user interface (such as a mobile data terminal (MDT)) be able to activate the second wireless interfaces 210, 216 on multiple devices in response to user input on the MDT.

Figure 4A:
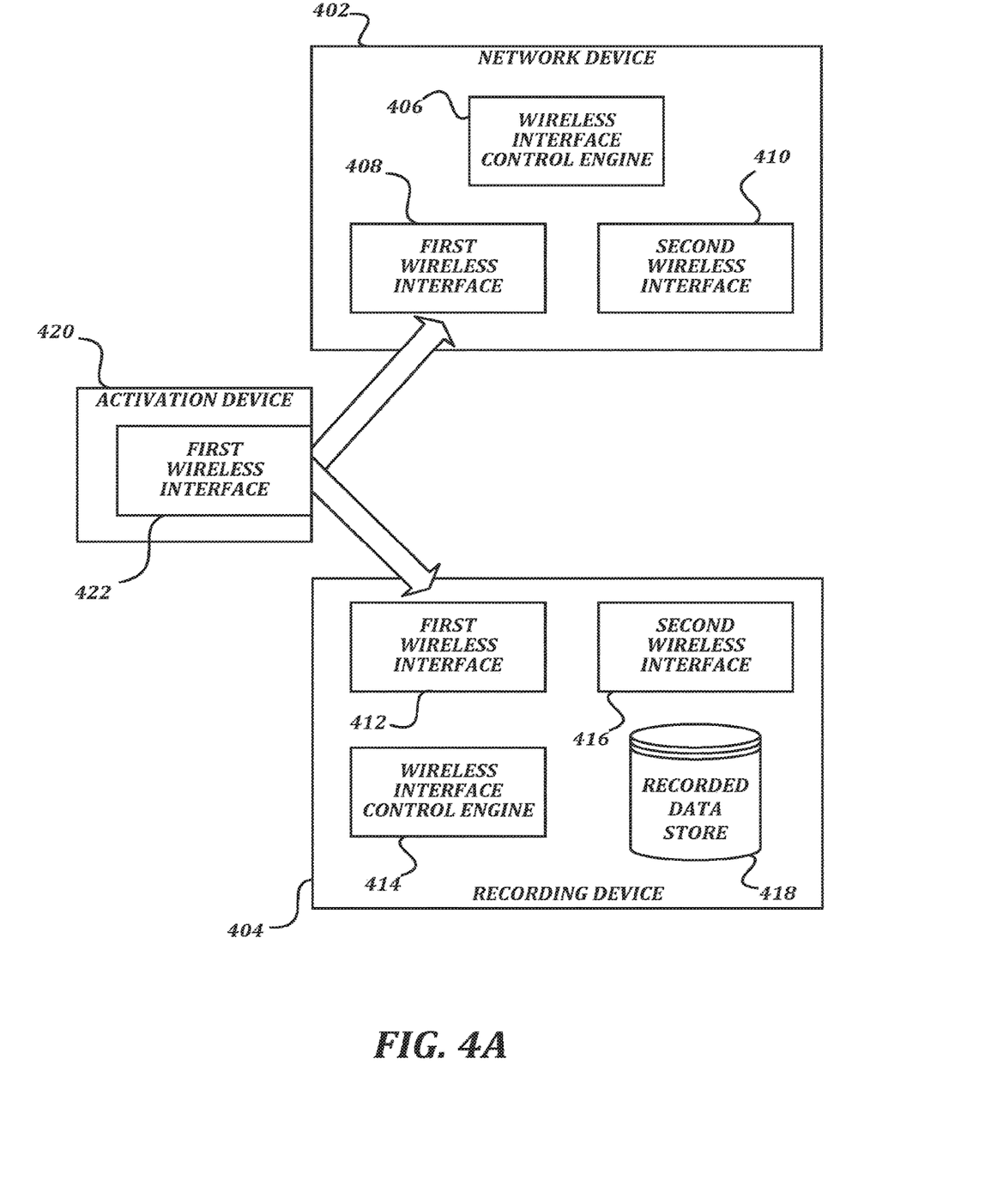
FIGS. 4A and 4B are block diagrams that illustrate an exemplary embodiment of an activation device being used to activate second wireless interfaces on a network device and a recording device according to various aspects of the present disclosure.
Figure 4B:
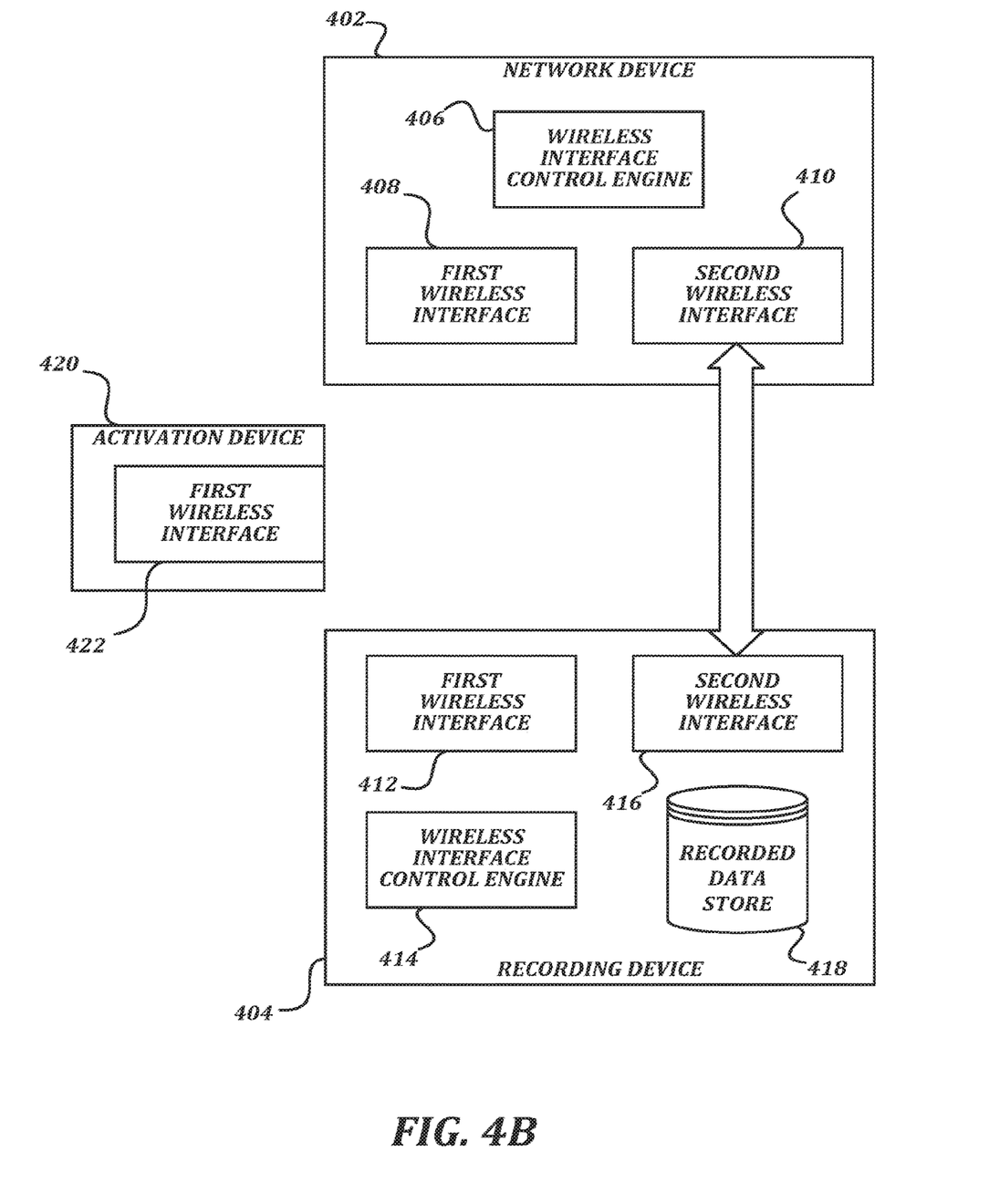

FIGS. 4A and 4B are block diagrams that illustrate an exemplary embodiment of an activation device being used to activate second wireless interfaces on a network device and a recording device according to various aspects of the present disclosure. The network device 402 and the recording device 404 are similar to the network device 202 and the recording device 204 illustrated and discussed previously, as are the components illustrated therein. Accordingly, detailed descriptions of these devices and components are not provided for the sake of brevity. Newly illustrated in FIG. 4A is an activation device 420. The activation device includes a first wireless interface 422 that is similar to the first wireless interfaces 408, 412 of the network device 402 and the recording device 404. However, the activation device 420 is configured to use the first wireless interface 422 to broadcast both the data notification to be received by the first wireless interface 408 of the network device 402 as well as the network notification to be received by the first wireless interface 412 of the recording device 404. FIG. 4B illustrates that after these notifications have been transmitted by the activation device 420, the network device 402 and the recording device 404 activate their respective second wireless interfaces 410, 416 and form a connection with each other (instead of with the activation device 420). The details of a method by which the connection is formed are similar to those described in the method 300 above, and so are not described in further detail herein. In some embodiments, the activation device 420 may only transmit the data notification, and the network device 402 or the recording device 404 may transmit the network notification.

In some embodiments, the activation device 420 may include its own device identifiers and/or related information in the connectionless notifications it transmits. As such, the network device 402 and/or the recording device 404 may check their whitelists and/or blacklists to determine whether they should take action in response to notifications received from the activation device 420. In some embodiments, the activation device 420 may include device identifiers and/or related information of one or more of the network device 402 and the recording device 404 in order to reduce the complexity of the whitelists and/or blacklists, and to more accurately represent the devices that will be communicating with each other.

Any suitable device may serve as an activation device 420. As stated above, in some embodiments, an MDT installed in the vehicle 94 may serve as an activation device 420. In some embodiments, a camera 106 may serve as an activation device 420 for other recording devices. In such embodiments, a particular combination or pattern of button presses may cause the notifications to be transmitted. In some embodiments, a network device 111 may serve as an activation device 420 for other network devices. In some embodiments, an evidence collection dock 104 may serve as an activation device 420. In some embodiments, a special purpose device installed in the vehicle 94 or carried by the user 92 may serve as an activation device 420. Such an activation device 420 may cause the notifications to be sent in response to a button press, in response to receiving another type of wireless signal, in response to detecting an event, and/or in response to any other suitable stimulus.

Figure 5:
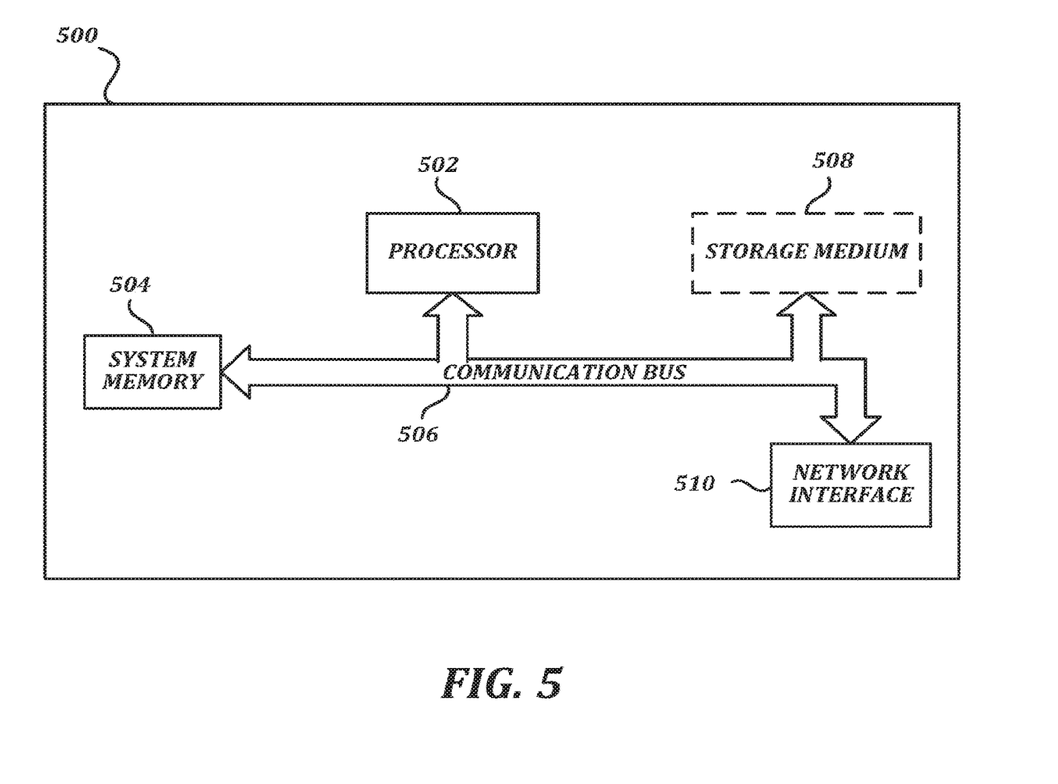
FIG. 5 is a block diagram that illustrates aspects of an exemplary computing device appropriate for use with embodiments of the present disclosure.

FIG. 5 is a block diagram that illustrates aspects of an exemplary computing device 500 appropriate for use with embodiments of the present disclosure. While FIG. 5 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 500 may be any one of any number of currently available or yet to be developed devices.

In its most basic configuration, the computing device 500 includes at least one processor 502 and a system memory 504 connected by a communication bus 506. Depending on the exact configuration and type of device, the system memory 504 may be volatile or nonvolatile memory, such as read only memory ("ROM"), random access memory ("RAM"), EEPROM, flash memory, or similar memory technology. Those of ordinary skill in the art and others will recognize that system memory 504 typically stores data and/or program modules that are immediately accessible to and/or currently being operated on by the processor 502. In this regard, the processor 502 may serve as a computational center of the computing device 500 by supporting the execution of instructions.

As further illustrated in FIG. 5, the computing device 500 may include a network interface 510 comprising one or more components for communicating with other devices over a network. Embodiments of the present disclosure may access basic services that utilize the network interface 510 to perform communications using common network protocols. The network interface 510 may also include a wireless network interface configured to communicate via one or more wireless communication protocols, such as WiFi, 2G, 3G, Long Term Evolution, WiMAX, Bluetooth, and/or the like.

In the exemplary embodiment depicted in FIG. 5, the computing device 500 also includes a storage medium 508. However, services may be accessed using a computing device that does not include means for persisting data to a local storage medium. Therefore, the storage medium 508 depicted in FIG. 5 is represented with a dashed line to indicate that the storage medium 508 is optional. In any event, the storage medium 508 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 504 and storage medium 508 depicted in FIG. 5 are merely examples of computer-readable media. Computer-readable media can also be used to store data for use by programs, and be used to implement a data store as discussed above.

Suitable implementations of computing devices that include a processor 502, system memory 504, communication bus 506, storage medium 508, and network interface 510 are known and commercially available. For ease of illustration and because it is not important for an understanding of the claimed subject matter, FIG. 5 does not show some of the typical components of many computing devices. In this regard, the computing device 500 may include input devices, such as a keyboard, keypad, mouse, microphone, touch input device, touch screen, tablet, and/or the like. Such input devices may be coupled to the computing device 500 by wired or wireless connections including RF, infrared, serial, parallel, Bluetooth, USB, or other suitable connections protocols using wireless or physical connections. Similarly, the computing device 500 may also include output devices such as a display, speakers, printer, etc. Since these devices are well known in the art, they are not illustrated or described further herein.

While the preferred embodiment of the invention has been illustrated and described, it will be appreciated that various changes can be made therein without departing from the spirit and scope of the invention.

What is claimed is:

1. A system comprising:
   a recording device, including:
     a first low-power wireless interface;
     a first high-power wireless interface, wherein at least a portion of the first high-power wireless interface is separate from the first low-power wireless interface;
     a data store;
     at least one first processor in communication with the first low-power wireless interface, the first high-power wireless interface, and the data store; and
     at least one first non-transitory computer-readable storage medium storing first instructions that, when executed by the at least one first processor, cause the at least one first processor to perform first operations comprising:
       storing a data record in the data store, wherein the data record comprises one or more of audio data recorded by the recording device or video data recorded by the recording device;
       broadcasting, via the first low-power wireless interface, a data notification, wherein the data notification comprises information regarding the recording device or the data record;
       after broadcasting the data notification, receiving, via the first low-power wireless interface, a network notification transmitted in response to the data notification, wherein the network notification comprises network identification information;

after receiving the network notification, selectively activating the first high-power wireless interface;

using the network identification information, establishing, via the first high-power wireless interface, a high-bandwidth connection; and transmitting, via the first high-power wireless interface, the data record via the high-bandwidth connection; and a network device, comprising:

a second low-power wireless interface;

a second high-power wireless interface, wherein at least a portion of the second high-power wireless interface is separate from the second low-power wireless interface;

at least one second processor in communication with the second low-power wireless interface and the second high-power wireless interface; and at least one second non-transitory computer-readable storage medium storing second instructions that, when executed by the at least one second processor, cause the at least one second processor to perform second operations comprising:

receiving, via the second low-power wireless interface, the data notification;

selectively activating the second high-power wireless interface based on the information regarding the recording device or the data record;

transmitting, via the second low-power wireless interface, the network notification;

connecting, via the second high-power wireless interface, to the recording device, wherein connecting to the recording device comprises establishing the high-bandwidth connection between the recording device and the network device; and after transmitting the network notification, receiving, via the second high-power wireless interface, the data record.

2. The system of claim 1, wherein the information regarding the recording device or the data record comprises a type of data stored in the data record; and selectively activating the second high-power wireless interface includes activating the second high-power wireless interface in response to determining that the network device is configured to process the type of data stored in the data record.

3. The system of claim 1, wherein the information regarding the recording device or the data record comprises a size of the data record; and selectively activating the second high-power wireless interface includes activating the second high-power wireless interface in response to determining that adequate storage space is available to the network device to store the data record based on the size of the data record.

4. The system of claim 1, wherein the information regarding the recording device or the data record comprises a size of the data record; and selectively activating the second high-power wireless interface includes activating the second high-power wireless interface in response to determining an amount of time it would take to transfer the data record and that the amount of time is within a predicted amount of remaining battery life.

5. The system of claim 1, wherein the information regarding the recording device or the data record comprises a device identifier;

selectively activating the second high-power wireless interface includes activating the second high-power wireless interface in response to determining that the device identifier is on a list of device identifiers associated with devices that are allowed to cause the second high-power wireless interface to be activated.

6. The system of claim 5, wherein the device identifier comprises a unique device identifier.

7. The system of claim 5, wherein selectively activating the second high-power wireless interface further comprises:

forming, via the second low-power wireless interface, a connection with the recording device via the first low-power wireless interface;

receiving further information from the recording device via the connection with the recording device; and activating the second high-power wireless interface based on the further information.

8. The system of claim 5, wherein the network device is an evidence collection dock and the recording device is a wearable camera.

9. The system of claim 5, wherein establishing the high-bandwidth connection comprises establishing an encrypted communication channel over which the data record is subsequently received by the network device.

10. The system of claim 5, wherein transmitting the data record comprises transmitting the data record while new data is being appended to the data record.

11. The system of claim 5, wherein the network device is configured to be installed in a vehicle and the recording device is a wearable camera.

12. The system of claim 11, wherein the second operations further comprise transmitting the data record to a storage system via a long-range wireless protocol.

13. The system of claim 11, wherein the network device is at least one of a mobile data terminal or a tablet computing device.

14. A wearable camera, comprising:

a low-power wireless interface;

a high-power wireless interface, wherein at least a portion of the high-power wireless interface is separate from the low-power wireless interface;

a data store;

at least one processor in communication with the low-power wireless interface, the high-power wireless interface, and the data store; and at least one non-transitory computer-readable storage medium storing instructions that, when executed by the at least one processor, cause the at least one processor to perform operations comprising:

storing a data record in the data store, wherein the data record comprises video data recorded by the recording device;

broadcasting, via the low-power wireless interface, a connectionless data notification, wherein the connectionless data notification comprises a device identifier of the recording device;

after broadcasting the connectionless data notification, receiving, via the low-power wireless interface, a network notification transmitted by a network device in response to the connectionless data notification, wherein the network notification comprises network identification information;

after receiving the network notification, selectively activating the high-power wireless interface;

using the network identification information, connecting, via the high-power wireless interface, to a network provided by the network device; and transmitting, via the high-power wireless interface, the data record over the network to the network device.

15. The wearable camera of claim 14, wherein activating the high-power wireless interface comprises at least one of initializing the high-power wireless interface or energizing a radio or antenna of the high-power wireless interface.

16. The wearable camera of claim 14, wherein connecting to the network comprises using an identifier provided in the network notification to determine credentials to be used to connect to the network provided by the network device.

17. The wearable camera of claim 14, wherein transmitting the data record comprises transmitting the data record while the data record is in the process of being updated.

18. A method of transferring a data record between a wearable camera and a network device, the method comprising:
- generating, by the wearable camera, a data record comprising at least one of audio information record by the wearable camera or video information recorded by the wearable camera;
- broadcasting, by the wearable camera, a data notification via a first low-power wireless interface of the wearable camera, wherein the data notification comprises a device identifier;
- receiving, by the network device, the data notification via a second low-power wireless interface of the network device;
- selectively activating, by the network device, a second high-power wireless interface based on the device identifier,
- transmitting, by the network device, a network notification via the second low-power wireless interface;
- receiving, by the wearable camera, the network notification via the first low-power interface;
- activating, by the wearable camera, a first high-power wireless interface of the wearable camera based on the network notification;
- connecting, by the wearable camera, to the network device via the first high-power wireless interface;
- transmitting, by the wearable camera, the data record via the first high-power wireless interface; and
- receiving, by the network device, the data record from the wearable camera via the second high-power wireless interface.

19. The method of claim 18, wherein selectively activating the second high-power wireless includes comparing the device identifier to a list of device identifiers that are allowed to activate the second high-power wireless interface or are restricted from activating the second high-power wireless interface.

20. The method of claim 19, further comprising transmitting, by the network device, the data record using a long-range wireless protocol, wherein the data record is transmitted from the wearable camera and transmitted from the network device while the data record is in the process of being updated at the recording device.

* * * * *